(12) United States Patent
Gerum

(10) Patent No.: US 7,428,944 B2
(45) Date of Patent: Sep. 30, 2008

(54) DRIVE TRAIN FOR A COMPRESSOR AND A HYDRAULIC PUMP

(75) Inventor: Eduard Gerum, Rosenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/859,321

(22) Filed: Sep. 21, 2007

(65) Prior Publication Data

US 2008/0093154 A1    Apr. 24, 2008

Related U.S. Application Data

(63) Continuation of application No. PCT/EP2006/001353, filed on Feb. 15, 2006.

(30) Foreign Application Priority Data

Mar. 22, 2005    (DE)    ........................ 10 2005 013 027

(51) Int. Cl.
*B62D 5/06*    (2006.01)
(52) U.S. Cl. ........................ 180/422; 180/405; 180/407; 180/446
(58) Field of Classification Search ................. 180/422, 180/405, 407, 446
See application file for complete search history.

(56) References Cited

U.S. PATENT DOCUMENTS 4,909,343 A * 3/1990 Mouri et al. ................ 180/422
5,273,129 A * 12/1993 Wright et al. ............... 180/407
6,382,342 B1 * 5/2002 Peppler ....................... 180/407

FOREIGN PATENT DOCUMENTS

| EP | 0 590 808 A1 | 4/1994 |
|---|---|---|
| GB | 2 397 138 A | 7/2004 |
| WO | WO 96/09464 A1 | 3/1996 |

OTHER PUBLICATIONS

International Preliminary Report on Patentability dated Jul. 11, 2007 with English translation and PCT/IPEA/409 (eighteen (18) pages).
International Search Report dated Jun. 7, 2006 (four (4) pages).

* cited by examiner

*Primary Examiner*—Lesley D. Morris
*Assistant Examiner*—Michael R Stabley
(74) *Attorney, Agent, or Firm*—Crowell & Moring LLP

(57) ABSTRACT

A drive train for a compressor and a hydraulic pump of a motor vehicle, and a method of use are described. The system includes a hydraulic power steering system, an electric superimposed steering system for providing steering assistance, and a motor vehicle drive motor with a common output shaft for driving the compressor and the hydraulic pump. Also provided are means for reducing the power which is supplied to the compressor and to the hydraulic pump via the output shaft, when demands made of the compressor and of the steering assistance system permit reduced power operation. The power which is supplied to the compressor and to the hydraulic pump via the output shaft may be reduced substantially to zero when operation of the compressor is unnecessary and the electric superimposed steering system is sufficient to provide alone the steering assistance.

6 Claims, 2 Drawing Sheets

DRIVE TRAIN FOR A COMPRESSOR AND A HYDRAULIC PUMP

CROSS REFERENCE TO RELATED APPLICATIONS

This application is a continuation of PCT International Application No. PCT/EP2006/001353, filed Feb. 15, 2006, which claims priority under 35 U.S.C. § 119 to German Patent Application No. 10 2005 013 027.5 filed Mar. 22, 2005, the entire disclosures of which are herein expressly incorporated by reference.

BACKGROUND AND SUMMARY OF THE INVENTION

The invention relates to a drive train for a compressor and a hydraulic pump of a motor vehicle which has a hydraulic power steering system and an electric superimposed steering system for providing steering assistance, wherein the compressor and the hydraulic pump are driven by using a common output shaft of a motor vehicle drive motor.

The invention also relates to a method for operating a compressor and a hydraulic pump of a motor vehicle which has a hydraulic power steering system and an electric superimposed steering system for providing steering assistance, wherein the compressor and the hydraulic pump are driven by using a common output shaft of a motor vehicle drive engine.

In modern motor vehicles, in particular in the field of commercial or utility vehicles, systems which are operated with compressed air are used in many cases. For example, the brakes, the pneumatic suspension, the transmission etc. use compressed air as a working medium. In the design and manufacture of such systems it is necessary to keep the power demand for providing compressed air as low as possible while ensuring continuous operational reliability of the systems. Nowadays it is customary to allow the compressor used for providing compressed air to continue to be driven by the engine of the motor vehicle in phases in which it is not feeding any compressed air. The air which is fed at such a time is however not utilized to provide compressed air but rather fed into the surrounding air. This typically causes a power loss of approximately 1 kW.

A further system which is also usually driven by a motor vehicle engine is the hydraulic power steering system. This reduces the steering forces which have to be applied by the driver in the stationary state when maneuvering the vehicle or at low travel speeds of the vehicle. The power demand of such a steering system, also referred to as a power steering system, is approximately 1 kW in the idling state and up to 8 kW in the case of a high demand, for example during maneuvering. In most systems of this type, the hydraulic pump of the steering assistance system is driven by using a through-drive at the compressor. In order to provide the driver with further functionalities in addition to the pure steering assistance, what is referred to as a superimposed steering system has been developed. In this system an additional torque is superimposed on the driver's manual torque, for example by an electric motor and a planetary gear mechanism at the steering column. With this superimposed steering system it is possible to carry out steering corrections in order to stabilize the vehicle as a function of the instantaneous driving state of the vehicle, for example using signals of an electronic stability program (ESP). It is also possible to implement functions such as a variable transmission ratio as a function of the speed of the vehicle or the steering speed as well as a variable power assistance which imposes the superimposed torque as a function of the torque to be applied by the driver.

The exemplary embodiments of the invention provide a drive train for generic applications, so that the compressor and the hydraulic pump can operate in a way which is efficient in terms of energy use.

The drive train according to exemplary embodiments of the invention provides the utilization of elements which reduce the power which is supplied to the compressor and the hydraulic pump via the output shaft, for example of the drive motor, if the demands which are being made of the compressor and of the steering assistance system permit it. This makes it possible for the power to be supplied to the compressor and hydraulic pump in a way which is largely suitable for the demand, thus avoiding unnecessary consumption of energy. In this context it is envisioned, for example depending on the demand profile of the compressor and hydraulic pump, for the power which is to be transmitted to be controllable in a plurality of stages, for example by a transmission or the like. It is also envisioned, if appropriate, in this context for a reduction of the power supplied by the drive shaft to be compensated by an increased power output by the superimposed steering system.

In one particularly preferred embodiment there is provision that the exemplary elements of the system reduce the power which is supplied to the compressor and to the hydraulic pump via the output shaft to zero, if it is not necessary for the compressor to operate and the electric superimposed steering system can provide the necessary steering assistance alone. In particular at a sufficiently high traveling speed there is generally no need for steering assistance, or only a relatively low level of steering assistance is required. This can be applied solely by the exemplary superimposed steering system. If in addition the compressor does not have to provide compressed air, the power flux to the exemplary compressor and hydraulic pump via the output shaft can be interrupted.

In an exemplary embodiment, there is preferably also a provision that the elements of the system include a clutch through which the power flux to the compressor and to the hydraulic pump can be interrupted. Such a deactivation clutch constitutes a cost effective and robust embodiment for disconnecting the compressor and hydraulic pump from the drive engine during suitable operating states. The deactivation clutch can be operated, for example, in idling feed phases in which the compressor would otherwise discharge its output into the surrounding air.

It can also be advantageous that the elements of the exemplary system include an electric control device which determines, on the basis of parameter values fed to it, how far the power which is supplied to the compressor and to the hydraulic pump via the output shaft can be reduced. In this exemplary embodiment, the power flux can be controlled by using specific measurement variables and/or actuation variables which characterize the instantaneous and/or anticipated power demand of the compressor and hydraulic pump. It is also envisioned to take into account further operating conditions of the vehicle such as, for example, the instantaneous driving behavior of the vehicle and parameters for the hydraulics, pneumatics or electrics. In this context the term control also includes control processes.

In particular it may be advantageous for a hydraulic accumulator to be provided which is kept filled in order to be able to make available sufficient steering assistance when demands are suddenly made of the hydraulic power steering system. For example, if the hydraulic pump receives a reduced level of power, or no power, from the drive shaft, it may be necessary to interrupt the power steering assistance by the hydraulics in order to keep the power steering system operationally available for an emergency. In this context it may be advantageous to provide a particularly large hydraulic accumulator in order to cover the time period up to the resumption of operation by the hydraulic pump.

An exemplary method according to the invention includes a system in which the power which is output to the compressor and the hydraulic pump via the output shaft is reduced if the demands which are being made of the compressor and the steering assistance system permit it. In this exemplary embodiment, the advantages of the invention are also implemented within the scope of a method.

The exemplary embodiments of the invention take advantage of the fact that if a vehicle is traveling at a relatively high speed, for example on a freeway, only a small degree of power steering assistance is necessary. This can be provided, for example, solely by the superimposed steering system. It is thus possible to implement a deactivation clutch for the compressor, and thus also for the steering assistance pump. The deactivation clutch may be controlled in an intelligent fashion. It may be activated, for example, if the following conditions are met:

The compressor does not have to feed, i.e. there is no need for compressed fluids.

The demand made of the power steering assistance system by the steering is low, which is determined for example by the pressure in the hydraulic system and by the speed of the vehicle.

The power steering assistance is deactivated by the hydraulics by using a suitable deactivation device in order to keep the hydraulic accumulator filled for an emergency.

In addition, embodiments of the invention may utilize an enlarged hydraulic accumulator in order to be able to reliably cover the time period for switching on the clutch.

Other objects, advantages and novel features of the present invention will become apparent from the following detailed description of the invention when considered in conjunction with the accompanying drawings.

BRIEF DESCRIPTION OF THE DRAWINGS

The invention will now be explained by way of example with reference to the accompanying drawings and by reference to preferred embodiments.

In the drawings.

DETAILED DESCRIPTION OF THE DRAWINGS

Figure 1:
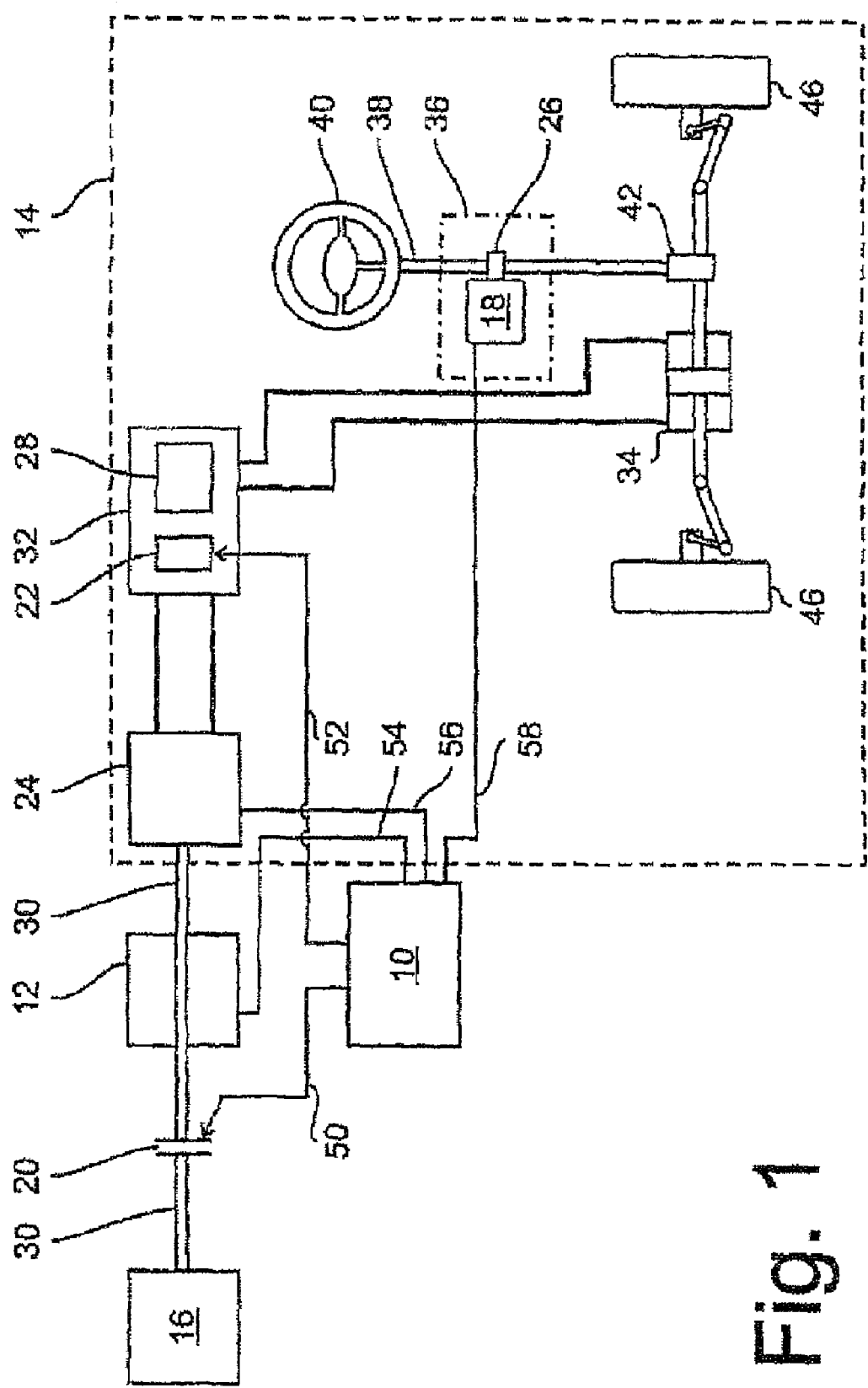
FIG. 1 is a block diagram of an embodiment of the drive train according to an embodiment of the invention.

FIG. 1 is a block diagram of an embodiment of an exemplary drive train according to the invention. The block diagram represents in a schematic fashion components of a steering assistance system which include a hydraulic power steering system 14 and an electric superimposed steering system 36. Furthermore, a compressed air compressor 12 is shown as part of a compressed air system (not shown) and an internal combustion engine 16 of a motor vehicle. The illustration is restricted here to the components which are necessary to describe the invention. The internal combustion engine 16 may be connected to the exemplary compressed air compressor 12 and the hydraulic pump 24 via an output shaft 30. The output shaft 30 is provided with a deactivation clutch 20, for example placed between the internal combustion engine 16 and compressor 12. The hydraulic pump 24 is coupled to a through-drive of the compressor 12 and may be part of a hydraulic power steering system 14. The power steering system 14 also includes hydraulic components 32 which include, inter alia, a hydraulic accumulator 28 and a deactivation device 22 as well as a hydraulic actuator 34. Furthermore, the steering assistance system includes an exemplary superimposed steering system 36. The latter may have, inter alia, an electric motor 18 which is connected to the steering column 38 via a planetary gear mechanism 26. The steering column 38 is connected to a steering wheel 40 and a steering gear 42 which is in turn connected to the wheels 46 via a rod and lever arrangement. Furthermore, a control 10 is provided. The latter may be connected via control lines 50, 52 to the deactivation clutch 20 and the deactivation device 22. In addition, there are signal lines 54-58 between the control 10 and the compressor 12, the hydraulic pump 24 and the electric motor 18.

The functionality of the power steering system 14 will be explained below. The hydraulic pump 24 generates the pressure which is required in the hydraulic system. A power steering assistance for the steering system can be disabled by using the deactivation device 22 and thus the pressure in the hydraulic system can be kept constant if the hydraulic pump 24 is stationary. The hydraulic components 32 make available the parts, such as valves, controllers etc., which are necessary for the functionality of the hydraulic system. The hydraulic accumulator 28 is dimensioned in such a way that it can provide hydraulic power during the time period required for the hydraulic pump 24 to start up, in order to make available sufficient pressure to the hydraulic system when a sudden high demand for power occurs.

The overall operation of the arrangement according to an embodiment of the invention is configured as follows: The internal combustion engine 16 drives the exemplary compressor 12 and the hydraulic pump 24 when the deactivation clutch 20 is closed. The exemplary control 10, for example an electronic control unit, determines the instantaneous state of the system via, inter alia, the signal lines 54-58 and, if appropriate, via other information lines (not illustrated here) and via the control lines 50, 52. If the control 10 determines that the compressor 12 does not need to feed any compressed air at a particular time, it checks the instantaneous demand profile to the power steering system 14. If it is determined from this that it can be anticipated that the torque which is requested by the system is so low that it can be provided solely by the superimposed steering system 36, the control 10 closes the deactivation device 22 via the signal line 52, and thus disables the provision of power steering assistance by the hydraulic system. The control 10 then opens the deactivation clutch 20 by using the control line 50 and thus interrupts the power flux from the internal combustion engine 16 to the compressor 12 and to the hydraulic pump 24. In this operating state, the compressor 12 and the hydraulic pump 24 consume essentially no power of the internal combustion engine 16. Any steering assistance is then made available by the electric superimposed steering system 36. If either a raised torque, which cannot be provided by the electric motor 18 is demanded or the compressor 12 has to feed, the control 10 closes the deactivation clutch 20 via the control line 50 and thus supplies the compressor 12 and the hydraulic pump 24 with power again. In addition, the control 10 may activate the hydraulic power steering system via the control line 52 and the deactivation device 22.

Figure 2:
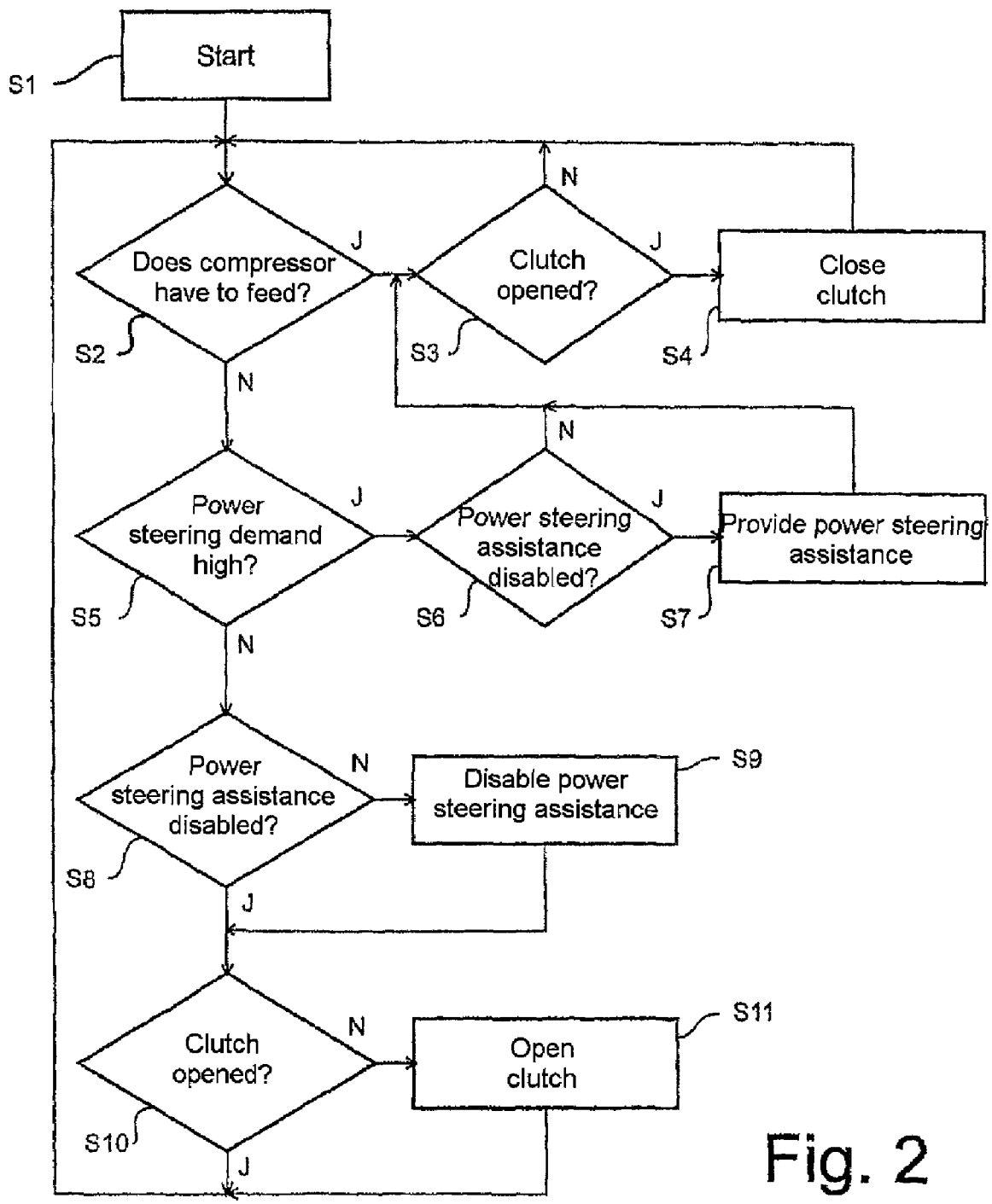
FIG. 2 is a flowchart explaining an embodiment of the method according to the invention.

FIG. 2 shows a flowchart explaining an exemplary embodiment of the method according to the invention. The method starts with step S1. In step S2, the instantaneous demand profile which is required of the compressor is checked. If it is determined in this context that the compressor has to feed, i.e. has to provide compressed air, it is checked with step S3 whether the clutch which connects the compressor to the drive is opened. If the clutch is opened, it is closed with step S4 and the system returns to the starting point of the method. If a clutch is already closed in step S3, the method is also started again. If, on the other hand, it is determined in step S2 that the compressor can be deactivated, the demand profile which is being required of the hydraulic power steering system is checked in step S5. If the demand profile does not permit the system to be switched off, it is checked with step S6 whether the hydraulic power steering assistance system is disabled at that particular time. If this is the case, the hydraulic assistance system is activated in step S7 and the method is continued with step S3. If the hydraulic assistance system is already active, the process is continued immediately with step S3. If there is a power steering profile which permits the system to be deactivated, the method is continued in step S8. In said step it is checked once more, as in step S6, whether the power steering assistance system is disabled. If this is not the case, this disabling process is carried out in step S9. The method then continues with step S10. It is checked in this step whether the deactivation clutch is in the open state. In the event of a negative test result, the clutch is opened in step S11. The method then continues with an opened clutch at the starting point S1.

The features of the invention which are disclosed in the present description, in the drawings and in the claims may be used for the implementation of the invention either individually or in any desired combination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The following reference numerals are provided to increase the clarity of the specification and drawings.

| | |
|---|---|
| 10 | Control |
| 12 | Compressor |
| 14 | Steering assistance system |
| 16 | Internal combustion engine |
| 18 | Electric motor |
| 20 | Deactivation clutch |
| 22 | Deactivation device |
| 24 | Hydraulic pump |
| 26 | Planetary gear mechanism |
| 28 | Hydraulic accumulator |
| 30 | Drive shaft |
| 32 | Hydraulic components |
| 34 | Hydraulic actuator |
| 36 | Superimposed steering system |
| 38 | Steering column |
| 40 | Steering wheel |
| 42 | Steering gear |
| 46 | Wheels |
| 50, 52 | Control lines |
| 54-58 | Signal lines |

What is claimed is:

1. A drive train for a compressor and a hydraulic pump of a motor vehicle, comprising:
    a hydraulic power steering system;
    an electric superimposed steering system for providing steering assistance;
    a motor vehicle drive motor with a common output shaft for driving the compressor and the hydraulic pump;
    means for reducing power which is supplied to the compressor and to the hydraulic pump via the output shaft when demands made of the compressor and of the steering assistance system permit reduced power operation, wherein
    the power which is supplied to the compressor and to the hydraulic pump via the output shaft is reduced substantially to zero when operation of the compressor is unnecessary and the electric superimposed steering system is sufficient to provide alone the steering assistance.

2. The drive train as claimed in claim 1, wherein the means for reducing power comprise a clutch for interrupting a power flux to the compressor and to the hydraulic pump.

3. The drive train as claimed in claim 1, wherein the means comprise an electric control device for determining, on the basis of parameter values fed to it, the reduction of the power supplied to the compressor and to the hydraulic pump via the output shaft.

4. The drive train as claimed in claim 3, further comprising a hydraulic accumulator which is kept filled to provide sufficient steering assistance when sudden demands are made of the hydraulic power steering system.

5. A method for operating a compressor and a hydraulic pump of a motor vehicle having a hydraulic power steering system and an electric superimposed steering system for providing steering assistance, comprising the acts of:
    driving the compressor and the hydraulic pump by a common output shaft of a motor vehicle drive motor;
    reducing power supplied to the compressor and to the hydraulic pump via the output shaft when demands which are being made of the compressor and the steering assistance system permit the power reduction; and
    reducing to substantially zero the power supplied to the compressor and to the hydraulic pump via the output shaft when operation of the compressor is unnecessary and the electric superimposed steering system is able to provide the steering assistance alone.

6. The method as claimed in claim 5, further comprising determining on the basis of suitable parameter values a degree of reduction in the power supplied to the compressor and to the hydraulic pump via the output shaft.

* * * * *